United States Patent
Pollack

[11] 3,980,403
[45] Sept. 14, 1976

[54] VARIABLE GRATING MODE IMAGING METHOD

[75] Inventor: Joel M. Pollack, Rochester, N.Y.

[73] Assignee: Xerox Corporation, Stamford, Conn.

[22] Filed: Feb. 25, 1975

[21] Appl. No.: 552,909

[52] U.S. Cl............................ 353/121; 350/160 LC; 350/162 R; 353/20; 353/122
[51] Int. Cl.²......................................... G03B 21/00
[58] Field of Search ............ 353/20, 120, 121, 122; 350/160 LC, 162 R

[56] References Cited
UNITED STATES PATENTS

| | | | |
|---|---|---|---|
| 3,592,527 | 7/1971 | Conners...................... | 350/160 LC |
| 3,744,879 | 7/1973 | Beard et al. ................. | 350/160 LC |
| 3,758,195 | 9/1973 | Hedman et al. .............. | 350/160 LC |
| 3,803,408 | 4/1974 | Assouline et al. ............ | 350/160 LC |
| 3,813,145 | 5/1974 | Hedman et al. .............. | 350/160 LC |

Primary Examiner—Richard E. Aegerter
Assistant Examiner—John W. Shepperd
Attorney, Agent, or Firm—James J. Ralabate; Michael H. Shanahan; George J. Cannon

[57] ABSTRACT

A novel projection imaging method. An imaging member is utilized comprising between two electrodes a negative photoconductor in contact with an about 1 to about 6 micron thick layer of nematic liquid crystalline material which, in the absence of an electrical field is provided in the homogeneous texture, and of negative dielectric anisotropy. A d.c. voltage above the parallel variable grating mode threshold for the nematic liquid crystalline material is applied between the two electrodes of the imaging member and the entire nematic layer goes into the parallel variable grating mode. While the voltage is applied, the negative photoconductor is exposed to imagewise configured actinic electromagnetic radiation and becomes more resistive in exposed areas. The actinic radiation causes the voltage to decrease across portions of the nematic liquid crystalline layer in contact with regions of the negative photoconductor exposed to the actinic radiation. The decrease in voltage across these portions of the liquid crystalline material is sufficient to cause cylindrical, vortical domains of molecules of the nematic liquid crystalline material in the parallel variable grating mode to disappear in imagewise configuration. Conventional Schlieren readout utilizing light linearly polarized in a direction orthogonal to the major axes of the vortical domains prevents unwanted exposure of the negative photoconductor while simultaneously maintaining the resistance of the negative photoconductor in imagewise configuration. Selective write and erase capabilities are provided.

9 Claims, 4 Drawing Figures

VARIABLE GRATING MODE IMAGING METHOD

BACKGROUND OF THE INVENTION

This invention relates to imaging and, more particularly, to imaging utilizing the imagewise deletion of parallel variable diffraction grating domains in thin layers of nematic liquid crystalline materials having negative dielectric anisotropy.

Liquid crystal diffraction gratings are known. See, for example, Carroll, *Journal of Applied Physics*, 43, 3 (1972); Greubel and Wolff, *Applied Physics Letter*, 19, 213 (1971). Variable grating mode domains in nematic liquid crystalline materials as distinguished from the Williams domains were denoted as such by Penz and Ford, *Physical Review A*, 6, 414 (1972) and studied by Greubel and Wolff. The Greubel and Wolff studies showed that the domains in the variable grating mode were formed in a direction perpendicular to the initial homogeneous alignment of the nematic liquid crystalline material. This alignment is hereinafter referred to as the perpendicular variable grating mode.

U.S. Pat. Nos. 3,758,195 and 3,813,145 to Hedman et al. are directed to information display apparatus utilizing as a diffraction grating, a cell containing a liquid crystalline material. It is believed that, at least in some instances, the diffraction results reported in these patents inherently resulted from a variable grating mode nematic liquid crystalline material having negative dielectric anisotropy but that the long axes of the domains in the variable grating mode were parallel to the initial homogeneous alignment (hereinafter referred to as parallel variable grating mode) rather than perpendicular as reported in the Greubel and Wolff article.

Electro-optical cells and displays having a photoconductor in contact with a layer of liquid crystalline material are known. See, for example, U.S. Pat. No. 3,707,322.

In new and growing areas of technology such as liquid crystal imaging, new methods, apparatus, compositions and articles of manufacture are often discovered for the application of the new technology in a new mode. The present invention relates to a novel method of imaging utilizing the formation and imagewise deletion of parallel variable grating mode domains.

SUMMARY OF THE INVENTION

It is, therefore, an object of this invention to provide a novel method of imaging.

It is another object of this invention to provide an imaging method utilizing the formation of parallel variable grating mode domains in a nematic liquid crystalline imaging member.

It is another object of this invention to provide a novel imaging method having selective imaging and erase capability.

It is yet a further object of this invention to provide a parallel variable grating mode liquid crystalline imaging method in which imagewise configuration of the grating mode domains is maintained by readout light.

The foregoing objects and others are accomplished in accordance with this invention by providing between two electrodes, a negative photoconductor in electrical contact with an about 1 to about 6 micron thick layer of homogeneously aligned nematic liquid crystalline material having negative dielectric anisotropy; forming parallel variable grating mode domains in the liquid crystalline layer by applying a d.c. voltage above the parallel grating mode threshold voltage; exposing the negative photoconductor to actinic electromagnetic radiation in imagewise configuration to delete domains in imagewise configuration; and reading out the imaged liquid crystalline layer by Schlieren optics with light linearly polarized in a direction othogonal to the major axes of the parallel variable grating mode domains.

A BRIEF DESCRIPTION OF THE DRAWINGS

For a better understanding of the invention, as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 2:
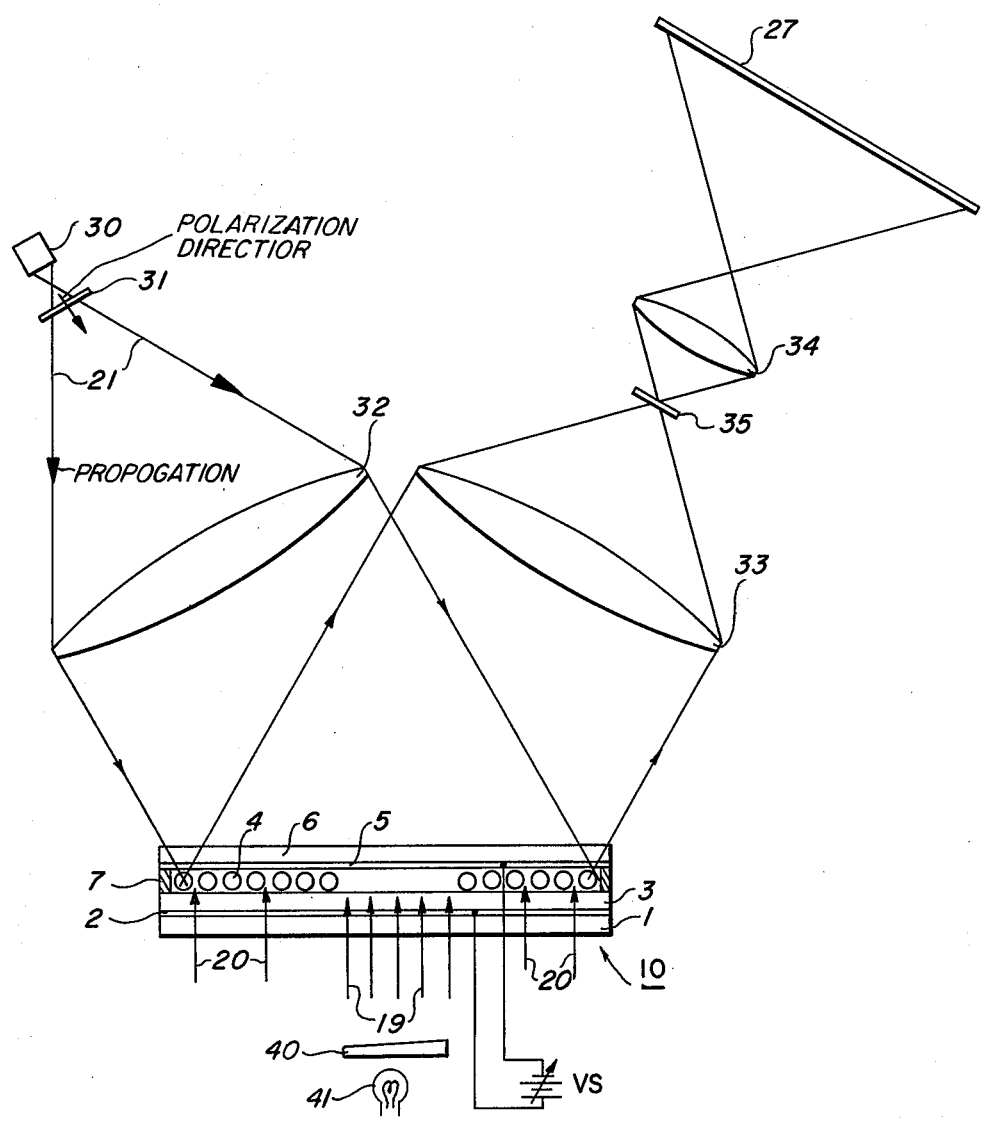
FIG. 2 is a cross-sectional schematic illustration of a preferred embodiment of the novel method of the present invention.
Figure 3:
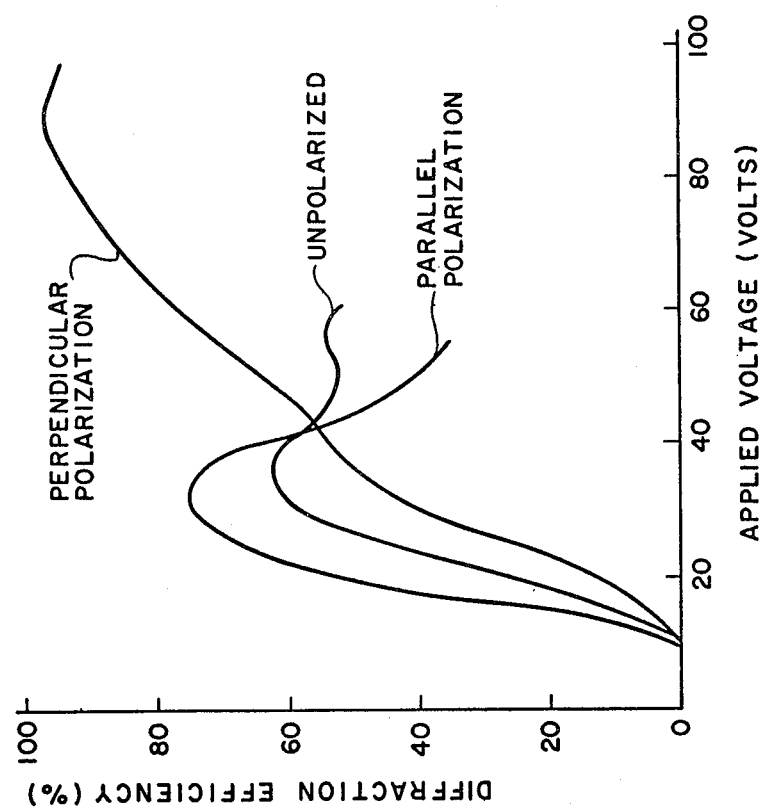
FIG. 3 is a graphical illustration of the typical diffraction efficiency pattern for light of varied polarizations.

Referring now to FIG. 2, there is seen an imaging member comprising substrates 1 and 6, transmissive conductive coatings 2 and 5, negative photoconductor 3, layer 4 of nematic liquid crystalline material having negative dielectric anisotropy; and spacers 7.

Substrates 1 and 6 can comprise any suitable electrically insulating substrate. Typical suitable electrically insulating materials include glass, plastic, papers, ceramics and other electrically insulating materials. Substrates 1 and 6 are respectively transmissive or semi-transmissive to the imaging actinic radiation 19 and the readout light 21 described below in connection with the description of the projection imaging method provided by the present invention. Conductive coatings 2 and 5 can comprise any suitable electrically conductive material. Typical suitable electrically conductive materials include gold, indium oxide, tin oxide, silver, and other conductors. Conductive coatings 2 and 5 are respectively transmissive to radiations 19 and 21.

Layer 3 of negative photoconductor material can comprise any suitable negative photoconductor material. Typical suitable negative photoconductive materials include selenium, stibnite ($Sb_2S_3$), molybdenum sulfide ($MoS_2$), the orthorhombic form of silver sulfide ($Ag_2S$) - scanthite, argentite - the isometric form of $Ag_2S$, silver bromide (AgBr), silver chloride (AgCl), cuprous oxide ($Cu_2O$), cadmium sulfide (CdS) and zinc oxide (ZnO). By "negative photoconductor" is meant that the photoconductor exhibits negative photoconductivity. "Negative photoconductivity" is used herein to mean the absorption of radiation by the photoconductor which results in a decrease in the conductivity of the photoconductive material. "Actinic" radiation is used herein to mean radiation of a wavelength within the absorption band of the photoconductive material which, upon absorption, results in a decrease in the conductivity of the photoconductive material. For example, stibnite ($Sb_2S_3$) is a negative photoconductor because upon absorption of light having a wavelength between about 5,035A and about 6,570A, the conductivity of stibnite decreases. The negative photoconductors suitable for use in the practice of the present invention includes those exhibiting positive photoconductivity along with negative photoconductivity so long as, for a given thickness of the photoconductor layer and for a given wavelength of light, the photoconductor exhibits greater negative photoconductivity than positive photoconductivity; for example, germanium.

While some negative photoconductors exhibit more conductivity in the dark than others, it is preferred for purposes of this invention to insure that the photoconductor is sufficiently conductive (prior to imaging with negative photoconductivity) by uniformly exposing the photoconductor to low levels of excitation light which renders the photoconductor more conductive; such as white light, for example, ambient white lighting. The white light, while comprising some light of actinic radiation wavelength is used at a sufficiently low intensity relative to the imaging actinic radiation intensity that only the latter causes a decrease in conductivity sufficient to delete parallel variable grating mode domains in the liquid crystalline layer. In summary, then, the imaging light is actinic to the negative photoconductivity of the photoconductor whereas the excitation light may or may not include wavelengths actinic to the negative photoconductivity but if it does the intensity is selected to be insufficient to cause domain deletion from the nematic layer.

The readout light 21 is monochromatic to insure good image resolution since this light will be diffracted by parallel variable grating mode domains in the layer of nematic liquid crystalline material. Further, the monochromatic readout light is linearly polarized in a direction orthogonal to the major axes of the domains of the parallel variable grating mode. Finally, the orthogonally linearly polarized monochromatic readout light can be selected of a wavelength that is actinic to the negative photoconductivity of the photoconductor when it is desired to maintain the domains in imagewise configuration in the absence of the imaging light.

Layer 4 of nematic liquid crystalline material having negative dielectric anisotropy can comprise any suitable dielectrically negative liquid crystalline nematic. These nematics align with the major axes of their molecules perpendicular to the electrical field created by a voltage applied between the two conductive coatings 2 and 5. Typical suitable nematics are disclosed in Vol. 18, Ann. Physique, page 273, G. Friedel (1922) hereby expressly incorporated by reference. Typical suitable dielectrically negative nematics include N-(p-methoxybenzylidene)-p-butylaniline (MBBA); p-azoxyanisole (PAA); N-(p-ethoxybenzylidene)-p-butylaniline (EBBA); dl-4-(2-methylhexyl)-4′-ethoxy-α-chlorotrans-stilbene; p-methoxybenzylidene-p′-aminophenyl-3-methylvalerate (MBV); p-ethoxybenzylidene-p′-aminophenyl-3-methylvalerate; pp′-methoxypentytolane (MPT); pp′-propoxyheptyltolane (PHT); pp′-dioctoxytolane (DOT), trans-4butyl-α-chloro-4′-ethoxystilbene, and Phase IV and Phase V, nematic liquid crystalline phases available under the trademark Licristal from E.M. Laboratories, Inc. Phase IV is eutectic mixture of

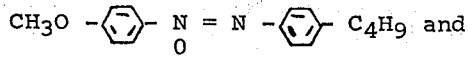

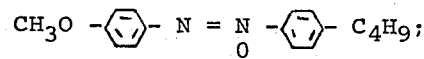

Phase V is a mixture of Phase IV and the eutectic mixture of

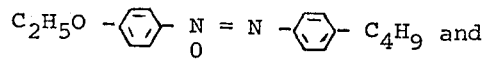

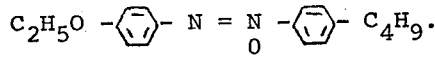

Spacers 7 are typically chemically inert. Materials suitable for use as insulating spacers 7 include cellulose acetate, cellulose triacetate, cellulose acetate butyrate, polyurethane elastomers, polyethylene, polypropylene, polyesters, polystyrene, polycarbonate, polyvinylfluoride, polytetrafluoroethylene, polyethylene terephthalate, and mixtures thereof. Spacers 7 can comprise vacuum evaporative materials which are vacuum evaporated outside the electrodes area of the imaging member, or on the photoconductor in the case of transparent non-conductive spacer chrome, silver, gold, aluminum and combinations thereof, and other conductors. Non-conductive transparent vacuum evaporative materials include transparent silicon oxides among others.

The vacuum evaporator spacers 7 are preferred because exceedingly high diffraction efficiencies result in the practice of the present invention when uniformity is provided in the thickness of layer 4 of nematic liquid crystalline material and in the homogeneous alignment of the nematic in the absence of an applied electrical field. Substantial uniformity in the thickness of layer 4 of nematic liquid crystalline material can be provided by utilizing uniformly sized non-conductive microspheres such as glass or latex microspheres. Any other technique suitable for producing uniform inter-electrode spacing can be employed.

It has been found that when the thickness of layer 4 of nematic liquid crystalline material is substantially uniform and is between about 1 micron to about 6 microns in thickness, and that when the zero field homogeneous alignment of the nematic liquid crystalline material in layer 4 is substantially uniform, then the variable grating mode obtained is one in which the domains form parallel to the zero field homogeneous alignment direction rather than perpendicular to that direction.

Figure 1:
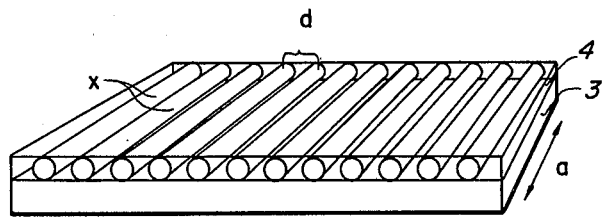
FIG. 1 is a partially schematic illustration of the parallel variable grating mode domains utilized in the practice of the present invention.

Referring now to FIG. 1, there is seen layer 3 of negative photoconductive material upon which resides layer 4 of nematic liquid crystalline material having negative dielectric anisotropy. The direction $a$ is the direction of zero-field homogeneous alignment of the nematic liquid crystalline material and the rod-shaped domains $x$ represent the vortical domains of the parallel variable diffraction mode. The long or major axes of $x$ are parallel to the $a$ direction. The vortical domains are believed to be formed due to the combined action of the electrical field and charge injection upon the nematic liquid crystalline material in layer 4. The electrical field is applied between conductive overcoatings 2 and 5 of FIG. 2 and therefore is applied perpendicular to the plane of layer 4 and perpendicular to the direction $a$ of zero field homogeneous alignment. Since the nematic liquid crystalline material in layer 4 has negative dielectric anisotropy, the applied field acts initially to retain the homogeneous alignment direction. It is believed further that charges are injected into the nematic liquid crystalline material of layer 4. When the applied voltage exceeds a threshold, fixed for a given material at a constant viscosity, torques are created which, in turn, causes vortical movement of the nematic liquid crystalline material. These, in aggregate, result in the formation of scroll-like cylindrical domains. It has been observed that adjacent tubes thus formed in layer 4 rotate in opposite directions. The distance $d$ between adjacent vortical tubes in the parallel variable grating mode and the size of the vortical tubes are, at threshold voltage equal to the thickness of layer 4, and have been found to vary in width conversely with the magnitude of the applied voltage. That is, with increase in applied voltage the size of adjacent vortical tubes and the distance therebetween decreases whereas with decreasing applied voltage the size of the vortical tubes and the distance therebetween increases.

Since there exists an accompanying optical anisotropy to each nematic liquid crystal molecule, the ordered arrangement of the molecules into cylindrical domains periodically varied the optical path length in a direction orthogonal to the major axes of the domains and in the plane of the liquid crystal layer. Therefore, these tubes exhibit the properties of an optical volume grating. Therefore, the spatial frequency of the resulting grating increases with increasing electrical voltage and decreases with decreasing voltage. Grating spatial frequencies can be varied from about 125 to more than 2000 (vortical cylindrical domains per millimeter).

Any technique for providing homogeneous alignment of the nematic liquid crystalline material in layer 4 can be utilized and, with the exercise of care, substantially uniform homogeneous alignment can be achieved.

Typical suitable homogeneous alignment techniques include the classical technique of rubbing the substrate as disclosed in P. Chatelain, Bull. Soc. Franc. Min. Crist., 66, 105 (1943); providing a coating of aligning agent in contact with layer 4 of nematic liquid crystalline material such as, for example, one of the homogeneous aligning agents listed in Vol. 61, No. 7, *Proceedings of the IEEE*, p. 833, July, 1973 in the article "Surface-Produced Alignment of Liquid Crystals" by Kahn, Taylor and Schonhorn; and, the so-called Janning Technique described by J. L. Janning in *Appl. Phys. Letts.*, 21, 173 (1972).

Figure 4:
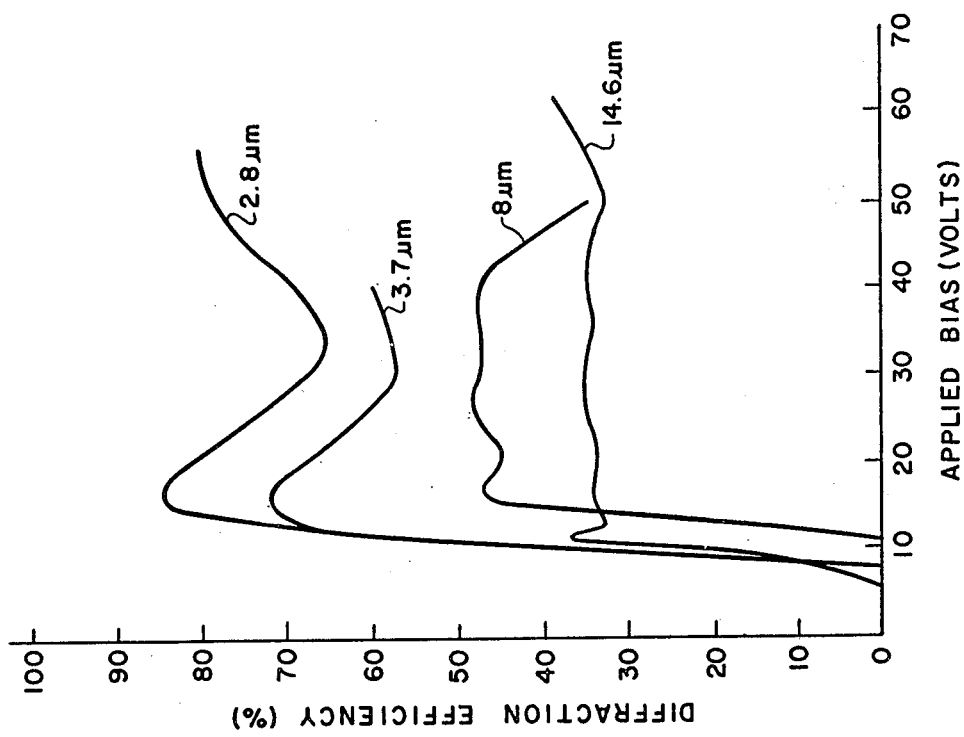

FIG. 4 is a graphical illustration of the unique benefit of extremely high diffraction efficiency provided by the utilization of the parallel variable grating mode exclusive of the photoconductor. It has been found that the behavior of the parallel variable grating mode is substantially the same with a photoconductor. As can be seen from FIG. 4, the thinner cells are markedly higher in diffraction efficiency than the relatively thicker cells. Cells of about 4.7 micron thickness and about 7.4 micron thickness were also utilized and the diffraction results (not shown in FIG. 4) fall within the trend established by FIG. 4. N5 of FIG. 4 is a mixture of terminally substituted aromatic azoxy compounds available from E.M. Laboratories, Inc., an affiliate of E. Merck Darmstadt, Germany. The material is a mixture of a material called N4 consisting of

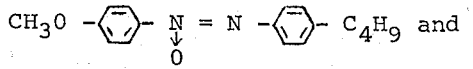

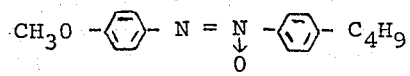

and the eutectic mixture of

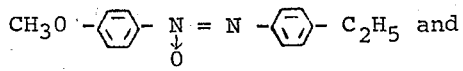

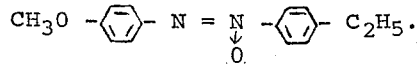

This material, used as received, is characterized by high resistivity ($\rho$ greater than or equal to $10^{10}$ ohm/cm) negative dielectric anisotropy ($-0.2$), and a dielectric constant of about 5.5.

EXAMPLE I

The measurements for FIG. 4 were made on cells constructed in the conventional parallel plate capacitor configuration using very flat plate glass of about 0.25 inch thickness coated with a transparent conductive layer of indium oxide. Both electrodes are selectively etched to provide a circular active area of about 1 square centimeter. Prior to assembly, the electrodes were rigorously cleaned in a bath of dichromic acid, followed by ultrasonic cleaning and then rinsed in distilled and highly filtered water. Once dry the electrodes were orientation rubbed, without the use of surfactants, in accordance with the Chatelain technique to promote homogeneous zero field alignment of the N5 nematic liquid crystal. Six cells are constructed having the interelectrode spacings (to be occupied by a layer 4 of the nematic) of 2.8, 3.7, 4.7, 7.4, 8 and 14.6 microns. The latter three thicker cells utilized Mylar strips are spacers; whereas, the three thinner cells were spaced with evaporated metallic layers of chrome overcoated with silver in the shape of a spot approximately 2 millimeters in diameter. The six cells were assembled and epoxied lightly at several points with a fast drying epoxy resin available from the Dexter Corporation under the name Epoxy Patch. Coplanarity of the confining electrodes was determined by observation of optical interference fringes visible through the use of a Van Keuren helium lamp illuminator. Measured variance was less than 0.5 optical fringe (.15 microns). Measurements of cell thickness were made by capacitive techniques using a General Radio Impedance Bridge (model 1615A) after filling with the N5 nematic. Filling of cells was by capillary action. Electrical connections were made in the conventional manner attaching leads to bus bars with epoxy resin and silver print paint. All subsequent measurements were made at ambient temperature, without any additional temperature control of the cells.

Microscopic observations were made using a Leitz Ortholux Polarizing Microscope. The diffraction efficiency of voltage induced phase gratings was measured as the relative decrease in the intensity of the zero order transmitted beam of an unpolarized Spectra Physics 133M 5mW helium-neon laser used for normal illumination of the cells. A conventional polarizer mounted in a calibrated turntable was introduced in the illuminating beam at a position between the laser and the cell for measurement of efficiency and response in polarized light. Light intensities were monitored using a color cell with appropriate neutral density filters to insure a linear response characteristic. Measurements of first and second order diffracted intensity required appropriate spatial filtering in the input plane of the detector. Spatial frequencies of stationary domains were determined from the Bragg relationship using measured angular deflections of the first order diffracted beam as a voltage to the test cell was varied incrementally In all cases it was observed that spatial frequency varied linearly with voltage whereas the rate of change of spatial frequency varied inversely with thickness.

EXAMPLES II–VII

Optical characterizations of the six cells were obtained as follows. Polarized microscopy confirmed that uniform homogeneous alignment was obtained in the zero field state, without the use of surfactants, over the entire electroded cell area. A threshold voltage of about 10 volts d.c. was always noted for all cells but the one having the about 14.6 micron thick nematic layer. This latter cell always exhibited a threshold voltage of about 5 volts d.c. The threshold voltage noted is the amount of voltage required to be applied prior to observation of any domains in the liquid crystal cell. The cell with nematic layers of about 2.8 and about 3.7 microns exhibited domains the major axes of which were parallel to the initial homogeneous rubbing direction. Immediately upon application of the threshold field, the perpendicular variable grating mode was momentarily observed and almost immediately switched to the parallel variable grating mode. In the cell with the about 4.7 micron thick nematic layer, upon application of the threshold voltage the cell briefly exhibited perpendicular variable grating mode but switched to the parallel variable grating mode and exhibited a preference for the parallel mode under steady state conditions. However, the about 4.7 micron thick cell, after a rest period of about 2 days, would initially exhibit the perpendicular variable grating mode under steady state conditions and then revert to the parallel variable grating mode with use.

The cells with about 7.4 micron, about 8 micron, and about 14.6 micron nematic layers exhibited a preference under steady state conditions of applied threshold voltage for the perpendicular variable grating mode. That is, the classical variable grating mode reported by Greubel and Wolff. The two thicker cells exhibited the classical perpendicular variable grating mode, however, the about 7.4 micron thick nematic layer would momentarily go into the parallel variable grating mode during extended use.

Accordingly, it is concluded that the about 4.7 micron thick cell and the about 7.4 micron thick cell bracket the thickness limit on parallel variable grating mode in that the thicker cell shows a steady state preference for the perpendicular variable grating mode and the thinner cell shows a steady state preference for the parallel variable grating mode.

Other observations in Examples I–VI include: the domain patterns in both parallel and perpendicular variable grating mode was stationary at a fixed voltage at or above threshold voltage, but with increasing voltage the width of the individual domains decreases. The perpendicular variable diffraction mode (thicker) cells exhibited dynamic scattering at voltages somewhat above threshold; whereas, for the variable grating mode (thin) cells, the width of the individual domains continued to diminish for voltages up to the level for electrical breakdown.

EXAMPLES VIII–XIII

The test cells are individually placed in their respective variable grating modes (parallel for the thin cells, perpendicular for the thick cells) and illuminated, in turn, with light linearly polarized in a direction perpendicular to the orientation of the domains and with light linearly polarized in a direction parallel to the domains. The efficiencies of the two orthogonal polarizations were compared with the efficiency of the non-polarized illumination and it is concluded that the unpolarized diffraction efficiency is an average of the efficiencies of the constituent polarizations. Peaks in diffraction efficiency for each test cell for polarized light, polarized in the direction of the domains and for unpolarized light occurred in the range between about 15 and about 40 volts d.c.; whereas the diffraction efficiency for each test cell for polarized light polarized perpendicular to the domains is greatest and continues to climb with increasing applied voltage. It is concluded that the test cells in the parallel variable grating mode are most efficient for light polarized parallel to the domains at lower applied voltages (lower spatial frequencies), while at higher applied voltages (higher spatial frequencies) the test cells in the variable grating domains are most efficient for light polarized perpendicular to the domains.

FIG. 4 is a graphical illustration of the typical diffraction efficiency pattern obtained when diffraction efficiency was plotted as a function of applied voltage for llight polarization parallel to the major axes of the domains, for light polarized perpendicular to the major axes of the domains, and for unpolarized light. FIG. 4 graphically illustrates that unpolarized diffraction efficiency is an average of the combination of the efficiencies of the constituent polarizations (parallel and perpendicular to the major axes of the domains of the variable grating mode) and demonstrates that the parallel and perpendicular constituents of unpolarized light have separate ranges of applied voltage in which optimum or maximum diffraction efficiency occurs. For example, while the plot of the data in FIG. 4 is representative of the behavioral trend of efficiency versus applied voltage for the test cells, the data utilized in FIG. 4 was obtained on the test cell having a nematic layer of about 3.7 micron in thickness. Therefore, for the cell having a nematic layer of about 3.7 micron in thickness and comprising Licristal Phase V, the threshold voltage for parallel variable grating mode is about 10 volts, but the highest diffraction efficiency is obtained between about 40 and about 100 volts and with light linearly polarized in a direction perpendicular to the major axes of the domains.

EXAMPLE XIV

An imaging member 10 (FIG. 2) is prepared as follows. Two commercially available flat glass plates about 0.25 inches thick and coated with a transparent conductive layer of indium oxide are cleaned in the manner previously described. By conventional photoresist etching techniques, an active area is provided on each of the glass substrates. After again cleaning the glass substrates, one of the substrates is provided with a negative photoconductive layer, about 2 microns thick, of stibnite, $Sb_2S_3$, by vacuum evaporation from a molybdenum boat. The negative photoconductivity of stibnite is exhibited in response to actinic radiation between about 5,035A and about 6,570A. The second plate is placed in a vacuum evaporator and is provided with four spacers outside of the active area. The spacers comprise a first vacuum evaporated coating of silver sufficient to provide a total spacer height of about 3.7 microns. A layer of silicon monoxide is deposited upon both plates in accordance with the previously referred to Janning Technique to induce homogeneous alignment of the nematic liquid crystalline materials. The two plates are then brought into spaced relationship, separated by the vacuum evaporated spacers and with the silicon monoxide coatings in opposed aligned relationship to each other. The photoconductive layer is deposited in a manner such that a portion of the active area remains uncovered to provide for electrical connection with a suitable voltage source. Completion of cell construction was then accomplished in accordance with the previously described procedured.

The imaging and Schlieren readout scheme depicted in FIG. 2 is set up utilizing an unpolarized helium-neon laser 41 as the source of imaging radiation 19 and a helium-neon laser 30 with a linear polarizer 31 is used to provide light 21 linearly polarized perpendicular to domains as readout radiation. Room (white) light is used for primary excitation light 20 for the photoconductor to render it uniformly conductive.

A variable source of d.c. voltage, VS, is electrically connected to the cell. A semi-transparent object 40 is inserted in the path of the imaging radiation from the unpolarized helium-neon laser.

With about 55 volts d.c. applied from the variable voltage source, the imaging laser and room light are turned on. An image is observed on screen 27 corresponding to the image transparency when the readout laser is turned on. An optical stop 35 is placed in the Fourier plane of the reflected readout light. A positive image appears on screen 27 when the zero order light is blocked; a negative image, when diffracted light is stopped.

The imaging helium-neon laser is turned off and the image remains on the screen 27.

The imaging helium-neon laser is reconfigured to expose the photoconductor in previously unexposed areas, passing the laser radiation through a second image transparency having a lesser amount of image information thereon. The previous image remains on screen 27 and now is modified to contain the added image information.

The voltage is turned off and screen 27 is blank. The voltage is reapplied with the actinic imagewise radiation maintained and only the new, added image information reappears. This added image information remains even when the imaging radiation is removed while the readout illumination is sustained.

With the imaging radiation off, the readout laser is momentarily turned off and the added image information disappears. The imaging laser is turned on and the added information reappears.

Referring now to FIG. 2, the parallel variable grating mode image in nematic liquid crystalline layer 4 is read out on screen 27. The reading radiation 21 is provided by radiation source 30, passes through linear polarizer 31 to become linearly polarized in a direction perpendicular to the domains' major axes, passes through collimator 32, and is diffracted by the imagewise configured parallel variable grating mode of nematic liquid crystalline layer 4 of cell 10. The readout radiation fails to expose the photoreceptor in regions where parallel variable grating mode domains reside in spite of the fact that this light is actinic upon direct illumination of the photoreceptor. This is possible by virtue of the property of the parallel variable grating mode domain to act as an analyzer to this polarized light and sufficiently attenuate light that would otherwise penetrate this layer. The reading radiation 21 is then reflected from cell 10 and comprises imagewise configured zero order radiation (non-diffracted radiation) and imagewise configured diffracted radiation. The zero-order and diffracted reading radiation passes through condenser lens 33 and field lens 34. Field lens 34 is positioned so that the plane of the nematic liquid crystalline layer 4 is focused upon screen 27. Optical stop 35 is positioned at the Fourier plane to stop either the zero order light which would then result in a positive image appearing upon screen 27 or to stop the diffracted light which would then result in a negative image appearing upon screen 27.

It will be appreciated that other variations and modifications will occur to those skilled in the art upon a reading of the present disclosure. These are intended to be within the scope of this invention.

For example, once the imagewise configuration of parallel variable grating mode domains is created by the actinic imaging radiation 19 and maintained by readout radiation 21 alone. Selective erasure can be obtained by interrupting exposure of the photoconductor beneath domains in the nematic layer.

Still another method of adding additional image information can be accomplished by either random or raster-wise scanning with a beam of actinic radiation. This can be done with polarized or unpolarized actinic radiation if the light is directed at the imaging side of the device directly. If, however, this is to be done by impinging this actinic radiation beam through the liquid crystal layer 4, onto the photoreceptor, then the radiation must be polarized in the direction parallel to domains.

Perpendicularly linearly polarized light does not pass through the domains sufficient to erase whereas parallel linearly polarized light does. It is believed that parallel variable grating mode domains act to polarize light in the plane parallel to the direction of domains. Thus, light perpendicularly polarized incident upon these domains is attenuated in a fashion similar to the manner in which conventional polarizers act to attenuate light polarized orthogonally to the polarization direction of that polarizer. It is further believed that parallel variable grating mode domains act to polarize light by a mechanism analogous to polarization by scattering by dielectric spheres, but with a higher degree of order.

What is claimed is:

1. A method of imaging, comprising:
    a. sandwiching between two transparent electrodes an imaging member comprising a negative photoconductor in contact with a layer of homogeneously aligned nematic liquid crystalline material; said layer of nematic material having a thickness of from about 1 to about 6 microns and said nematic material having negative dielectric anisotropy;
    b. applying a D.C. voltage between said two electrodes above the parallel variable grating mode threshold voltage level for said nematic liquid crystalline material;

c. uniformly exposing said negative photoconductor to excitation radiation from the photoconductor side of said imaging member in an amount sufficient to form on said layer of nematic liquid crystalline material domains of the parallel variable grating mode, and to image configured actinic radiation which causes deletion of domains and formation of an imagewise configured array of domains in said layer of nematic material; and d. reflecting from the liquid crystalline layer side of said imaging member monochromatic light linearly polarized in a direction perpendicular to the major axis of the domains in the layer of nematic material.

2. The method of claim 1 further including the step of erasing said imagewise configured array of domains by removing said applied voltage.

3. The method of claim 1 wherein said monochromatic light is actinic to said negative photoconductor further including the step of removing said imagewise configured actinic radiation.

4. The method of claim 3 further including the step of erasing said imagewise configured array of domains by removing the imagewise configured actinic radiation and linearly polarized monochromatic light.

5. The method of claim 1 further including the step of selectively erasing a portion of said imagewise configured array of domains by exposing said negative photoconductor to actinic radiation.

6. The method of claim 1 wherein said nematic material comprises a mixture of the eutectic mixture of

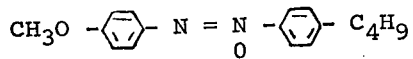

and

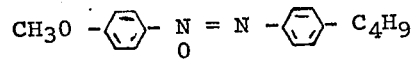

and eutectic mixture of

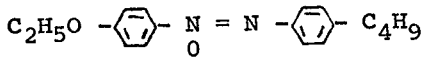

and

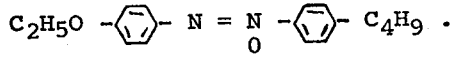

7. The method according to claim 6 wherein said negative photoconductor comprises $MoS_2$.

8. The method according to claim 7 wherein said imagewise configured actinic radiation comprises radiation from a helium-neon laser.

9. The method of claim 8 wherein said monochromatic light reflected from said layer of nematic material is actinic to said negative photoconductor, further including the step of removing said imagewise configured actinic radiation.

* * * * *